United States Patent [19]

Harrison

[11] 4,031,984

[45] June 28, 1977

[54] BRAKE ACTUATOR AND THRUST RECEIVING STRUCTURE

[75] Inventor: Anthony William Harrison, Birmingham, England

[73] Assignee: Girling Limited, Birmingham, England

[22] Filed: June 8, 1976

[21] Appl. No.: 693,800

[30] Foreign Application Priority Data

June 9, 1975 United Kingdom ............ 24697/75

[52] U.S. Cl. .............................. 188/59; 74/89.15; 188/71.1; 188/71.9; 188/197; 192/94; 269/179
[51] Int. Cl.² ..................................... B61H 15/00
[58] Field of Search ............ 188/79.5 ST, 202, 203, 188/71.8, 71.9, 72.8, 72.7, 72.3, 72.4, 58, 59, 196 BA, 71.1, 197; 192/111 A, 94; 74/89.15; 269/173, 179, 180

[56] References Cited

UNITED STATES PATENTS

| 1,815,859 | 7/1931 | Martin | 188/202 |
| 2,612,968 | 10/1952 | Hood | 188/72.8 X |
| 3,941,220 | 3/1976 | Harrison | 188/196 BA |

Primary Examiner—George E. A. Halvosa
Attorney, Agent, or Firm—Scrivener, Parker, Scrivener & Clarke

[57] ABSTRACT

A brake comprises a friction pad carried by a support and engageable with a braking surface of a rotor. An adjusting device moves the friction pad relative to the support to compensate for wear of the friction material. The adjusting device comprises a screw extending parallel with the direction of movement of the friction pad and a thrust member in screw threaded engagement with the screw member and engaging the friction pad. The thrust member transmits braking forces from the screw member to the friction pad and can rock into force-transmitting engagement with the support under the action of the braking and reaction forces.

6 Claims, 4 Drawing Figures

BRAKE ACTUATOR AND THRUST RECEIVING STRUCTURE

This invention relates to brakes.

Brakes are known in which a friction pad is supported by a support member which is movable towards and away from a rotor having a braking surface. Such brakes may have adjusting means which move the friction pad towards the rotor surface as the pad wears.

In a previously proposed form of brake the adjusting means comprises a screw member extending substantially parallel with the direction of movement of an elongate friction pad and at least partially alongside the pad. The braking force is transmitted through the support member and the screw member to the friction pad which is thereby applied to the rotor surface.

The braking force may be transmitted to the friction pad from the screw member through the intermediary of a nut screwed on to the screw member, but this arrangement has the disadvantage that, if no other support is provided, a large bending moment is applied to the screw member due to the offset of the friction pad from the screw member. Even if the nut is supported for example by guides in the supporting member, essential clearances and manufacturing tolerances may still cause some bending moment on the screw member. Because of the bending moment, the screw member has to be larger than would be necessary to support an equivalent axial load.

It is considered that a self-aligning nut in a separate cross-head may overcome the problem of the bending moment applied to the screw member, but this adds to the complexity and cost of the adjusting means. Furthermore, as the friction pads wears the length of the screw member that is in compression increases and there is a possibility that Euler failure of the screw member could occur unless it is of substantial size.

The present invention aims at overcoming the aforementioned disadvantage and provides a brake comprising a body of friction material for engagement with a braking surface of a rotor; a support for the body of friction material; adjusting means which moves the body of friction material relative to the support to compensate for wear of the friction material, said adjusting means comprising a screw member extending substantially parallel with the direction of movement of the body of friction material, and a thrust member in screw threaded engagement with the screw member and engaging the body of friction material to transmit braking forces from the screw member to the body of friction material; and means for applying braking forces to said screw member; wherein the thrust member can rock into forcetransmitting engagement with the support under the action of the braking and reaction forces.

In a preferred embodiment of the invention rotation of the thrust member urges the screw member into engagement with the support so that the thrust member and screw member are clamped or wedged together in the support.

Preferably the support is closely adjacent the screw member along the length of and over substantially half the circumference of the screw member.

A braking system including a disc brake in accordance with the invention mounted on a railway vehicle will now be described, by way of example, with reference to the accompanying drawings in which.

Figure 1:
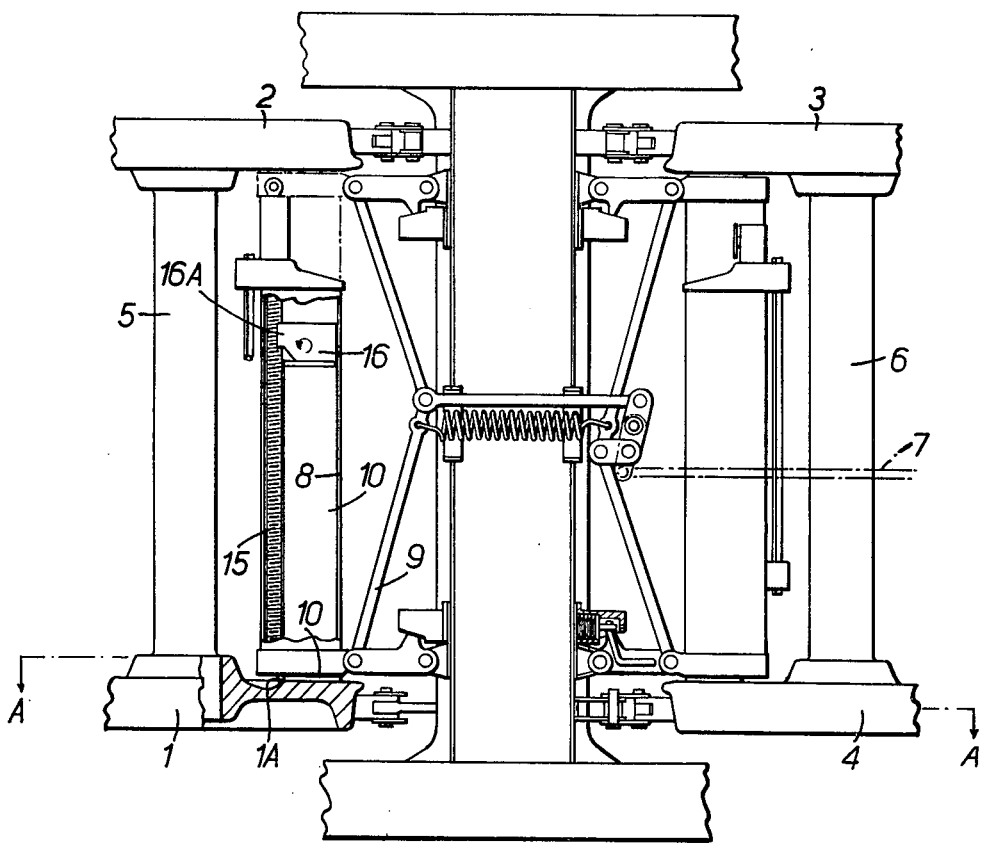
FIG. 1 is a plan view of the braking system.
Figure 3:
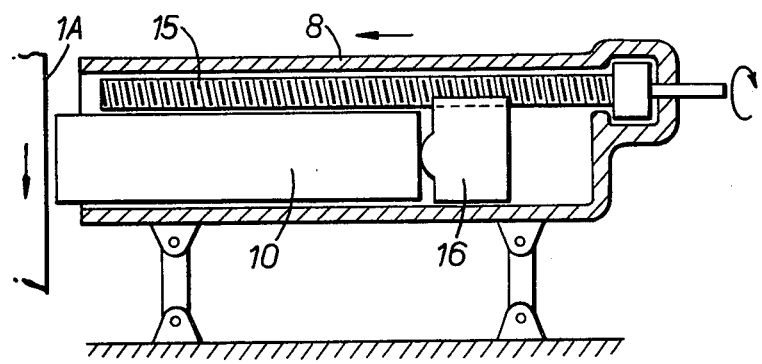
FIG. 3 is a diagrammatic axial cross-section of part of a brake shown in FIG. 1

The braking system of FIG. 1 includes four brakes acting on respective wheels 1 to 4 mounted in pairs on axles 5, 6. Only the brake for wheel 1 will be described here in detail, the brakes for the other wheels being substantially the same and all four brakes being actuated through a linkage by a common actuating rod 7. Each brake comprises a support tube 8 connected at its outer end close to the wheel braking surface 1A to a rod 9 of the operating linkage. The tube 8 supports an elongate friction pad 10 which extends through the end of the tube and lies parallel with an adjusting screw member 15 rotatably supported in the tube 8, as is more clearly seen in FIG. 3. A thrust member 16 has a part-cylindrical portion 16A in screw threaded engagement with the screw member 15 and is in engagement with the inner end of friction pad 10.

Figure 4:
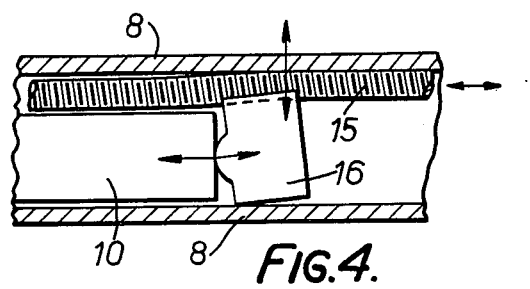
FIG. 4 is an enlarged detail view illustrating the relative positions of elements of the brake of FIG. 3 during brake application.

In operation the actuating rod 7 is pulled and the braking force is transmitted through the rod 9 to the tube 8 and urges the tube towards the wheel braking surface 1A. The force is transmitted from the tube 8 through the screw member 15 and thrust member 16 to the friction pad 10 to apply the friction pad to the surface 1A. Because the load acting on the portion 16A of the thrust member is offset from the direction of application of the load from the thrust member 16 to the friction pad 10, a couple is set up which tends to rotate the thrust member anti-clockwise as seen in FIG. 4. This rotation of the thrust member 16 urges the screw member 15 into engagement with the wall of the tube 8 and urges the thrust member 16 into engagement with the wall on the opposite side of the tube to provide a wedging or clamping action. In this way some of the braking reaction forces are transmitted to the tube 8 through the screw member 15 and the thrust member 16, the remainder being transmitted directly through the screw.

Figure 2:
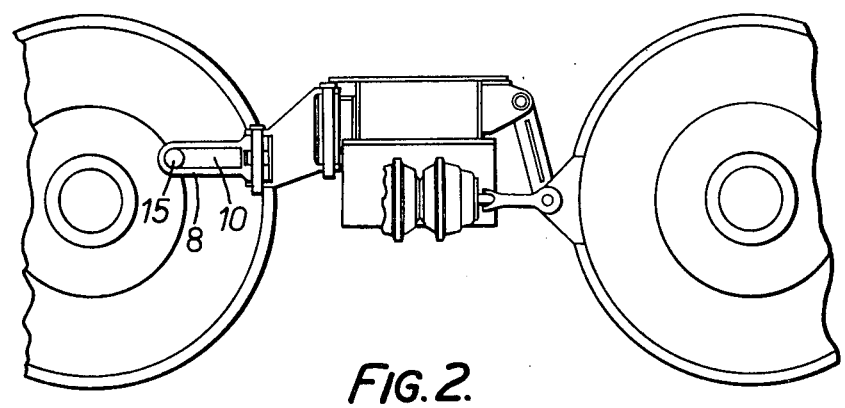
FIG. 2 is a section taken along the line A—A of FIG. 1.

As shown more clearly in FIG. 2, the wall of the tube 8 adjacent the screw member 15 is so shaped as to engage the screw member 15 over about one half of the circumference of the latter. Furthermore, the surface of the thrust member 16 engaging the wall of the tube may be curved to permit the rotation of the thrust member.

As the friction pad wears, adjustment is made by rotating the screw member, which moves the thrust member relatively thereto along the tube. Thus, although the braking force does not change during the life of the pad, the length of the screw member which carries this load increases considerably. If the screw member were not clamped between the thrust member and the tube during a brake operation there would be considerable risk of an Euler type failure of the screw member which risk would increase as the friction pad wore. However, in the above-described arrangement the screw member is clamped tightly between the tube and the thrust member and this significantly increases the load above which Euler failure can occur and the dimensions of the screw member may, therefore, be significantly reduced.

In an alternative embodiment, the shape of the tubular member and the thrust member could be arranged so that lateral reaction forces are not transmitted through the screw member, but are absorbed by the opposite side wall of the tubular member. With this embodiment, the screw member has to be strong enough to withstand Euler failure, but the stress and wear on the thread is less than in the previously described embodiment.

It will be appreciated that in the above described embodiment that the portion 16A of the thrust member is only part cylindrical so that as adjustment takes place any dirt or corrosion on the screw member is removed. In addition, the partial threads of the portion 16A may have sharp cutting edges to assist in the removal of dirt.

Although each of the above-described brakes acts on the side of a wheel, each brake could act on the tread of the wheel or on the exterior of a drum, for example.

A reinforcing member may be connected to the body of friction material at the end remote from that engaging the rotor surface and a resilient assembly may be inserted between the reinforcing member and the thrust member.

I claim:

1. A brake for a rotor having a braking surface, said brake comprising a body of friction material having a forward end engageable with said braking surface and a rear end; a support for said body of friction material; adjusting means which moves said body of friction material relative to said support to compensate for wear of the friction material, said adjusting means comprising a screw member extending substantially parallel with the direction of movement of said body of friction material, and a thrust member in screw threaded engagement with said screw member and engaging said body of friction material to transmit braking forces from said screw member to said body of friction material; and means for applying braking forces to said screw member; wherein said thrust member can rock into force-transmitting engagement with said support under the action of the braking and reaction forces, the rotation of said thrust member urging said screw member into engagement with said support, whereby said thrust member and screw member are clamped together in said support and reaction forces are transmitted transversely of said screw member and said thrust member to said support in the region of the engagement between said thrust member and said screw member.

2. A brake according to claim 1, wherein said support is closely adjacent said screw member along the length of and over substantially half the circumference of said screw member.

3. A brake according to claim 1, wherein said thrust member has a part-cylindrical nut portion in screw-threaded engagement with said screw member and a laterally extending portion having a face in engagement with said rear end of said body of friction material.

4. A brake according to claim 3, wherein said face of said thrust member is curved to permit rotation of said thrust member on said rear end of said body of friction material.

5. A brake according to claim 1, wherein said support comprises a tubular housing which houses said adjusting means and said friction material and which is in thrust-transmitting engagement with said screw member, said housing being movable relative to said rotor to apply braking forces to said screw member.

6. A brake according to claim 1, including means for rotating said screw member in response to detection of wear of said body of friction material to move said thrust member relative to the screw member.

* * * * *